(12) United States Patent
Yang et al.

(10) Patent No.: US 9,618,715 B1
(45) Date of Patent: Apr. 11, 2017

(54) OPTICAL FIBER ADAPTER WITH SHUTTER MEMBER

(71) Applicant: PROTAI PHOTONIC CO., LTD., New Taipei (TW)

(72) Inventors: Jyh-Cherng Yang, Taipei (TW); Yu-Kai Chen, Taipei (TW)

(73) Assignee: Protai Photonic Co., Ltd., New Taipei (TW)

( * ) Notice: Subject to any disclaimer, the term of this patent is extended or adjusted under 35 U.S.C. 154(b) by 0 days.

(21) Appl. No.: 15/011,781

(22) Filed: Feb. 1, 2016

(30) Foreign Application Priority Data

Oct. 2, 2015 (TW) .................................. 104132519

(51) Int. Cl.
  *G02B 6/42* (2006.01)
  *G02B 6/38* (2006.01)

(52) U.S. Cl.
  CPC ......... *G02B 6/4296* (2013.01); *G02B 6/3825* (2013.01); *G02B 2006/4297* (2013.01)

(58) Field of Classification Search
  CPC ................ G02B 6/3825; G02B 6/4296; G02B 2006/4297
  USPC ............................................ 385/78–88, 147
  See application file for complete search history.

(56) References Cited

U.S. PATENT DOCUMENTS

| | | | | |
|---|---|---|---|---|
| 8,202,009 | B2* | 6/2012 | Lin | G02B 6/3825 385/55 |
| 8,821,031 | B2* | 9/2014 | Lin | G02B 6/3825 385/59 |
| 9,323,007 | B1* | 4/2016 | Yang | G02B 6/3825 |
| 2013/0071068 | A1* | 3/2013 | Lin | G02B 6/3825 385/75 |
| 2015/0192744 | A1* | 7/2015 | Lin | G02B 6/3807 385/75 |
| 2016/0306121 | A1* | 10/2016 | Yang | G02B 6/3825 |

* cited by examiner

*Primary Examiner* — Akm Enayet Ullah
(74) *Attorney, Agent, or Firm* — Rosenberg, Klein & Lee

(57) ABSTRACT

An optical fiber adapter according to the present disclosure includes a main body, an inner housing, an elastic shutter member and a spring. The main body has an axial accommodation room defined by a first wall, a second wall, a third wall and a fourth wall. The accommodation room has opposing first and second openings in the axial direction. The inner housing is placed within the accommodation room and includes a hollow cylinder extending from the front surface of a flange. The shutter member is positioned within the accommodation room and includes a base portion, a shutter plate and a connecting portion. The connecting portion connects the base portion with the shutter plate. The shutter plate extends from the connecting portion and arrives in front of an opening of the hollow cylinder. The shutter plate is movable with respect to the base portion. The spring is positioned within the accommodation room to push the shutter member toward the first opening of the accommodation room.

11 Claims, 11 Drawing Sheets

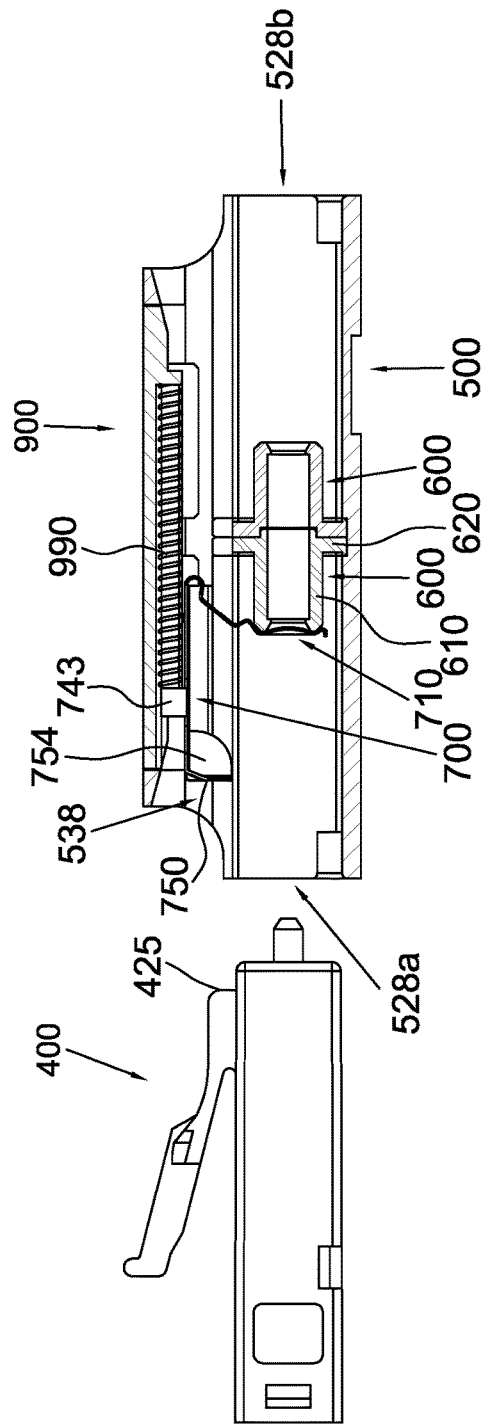
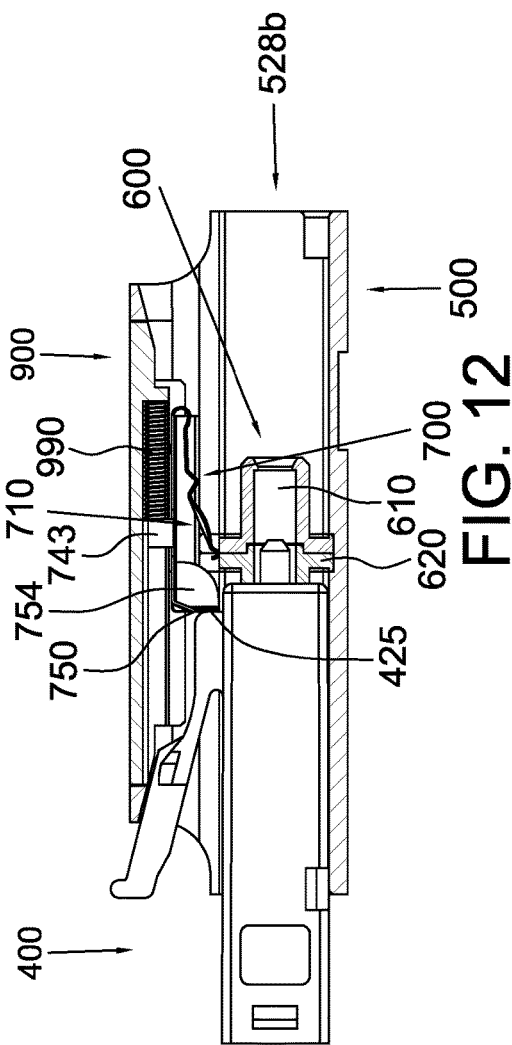
FIG. 11
FIG. 12

OPTICAL FIBER ADAPTER WITH SHUTTER MEMBER

RELATED APPLICATION

The present application is based on and claims priority to Taiwanese Application Number 104132519, filed Oct. 2, 2015, the disclosure of which is hereby incorporated by reference herein in its entirety.

BACKGROUND

1. Technical Field

The disclosure relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Referring to FIG. 1, a conventional optical fiber adapter 100 includes a housing 110 having a plurality of side walls 160. The side walls 160 define a receiving recess 120. One of the side walls 160 is provided with a slot 130 for mating with the key 192 of an optical fiber connector 190 when the connector 190 is inserted into the receiving recess 120. In addition, the outer surfaces of two opposite side walls 160 are provided with recesses 140 that a clip (not shown in the figure) may be disposed thereon to facilitate the adapter 100 to be mounted on a panel.

In general, the adapter 100 further has another set of side walls 160 that defines another receiving recess 120. The two receiving recesses 120 are opposite and may respectively receive a connector 190. Of course, the two receiving recesses 120 of the adapter 100 may be designed to mate with two different types of connectors. The connector 190 is always attached to one end of an optical fiber cable 194 and a light beam may propagate down the optical fiber cable 194 and emit from the ferrule 196 of the connector 190. Likewise, a light beam may be coupled into the optical fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the optical fiber cable 194 of a connector 190 through the interface between the two ferrules 196 and then reach the optical fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This may obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Referring to FIG. 2, a conventional optical fiber adapter 200 is generally the same as the adapter 100 but further includes a cover 250 pivotally connected to the housing 110. The cover 250 covers the receiving recess 120 in its closed position. A spring 260 may force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Referring to FIG. 3, a conventional protection cap 300 for the optical fiber adapter 100 includes a hollow housing 310 with two opposing openings and a cover 350 pivotally connected to the housing 310. The cover 350 is pivoted to cover one of the two openings through a spring 360. The protection cap 300 may be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY

The present disclosure provides a shutter member for an optical fiber adapter that may obstruct the light beams emitted from the accommodation room thereby preventing the eyes from exposure to the light beams.

In one embodiment, the optical fiber adapter of the present disclosure includes a main body, an inner housing, an elastic shutter member and a spring. The main body has an axial accommodation room defined by a first wall, a second wall, a third wall and a fourth wall. The accommodation room has opposing first and second openings in the axial direction. The inner housing is placed within the accommodation room and includes a hollow cylinder extending from the front surface of a flange. The shutter member is positioned within the accommodation room and includes a base portion, a shutter plate and a connecting portion. The connecting portion connects the base portion with the shutter plate. The shutter plate extends from the connecting portion and arrives in front of an opening of the hollow cylinder. The shutter plate is movable with respect to the base portion. The spring is positioned within the accommodation room to push the shutter member toward the first opening of the accommodation room.

The foregoing, as well as additional objects, features and advantages of the disclosure will be more readily apparent from the following detailed description, which proceeds with reference to the accompanying drawings.

BRIEF DESCRIPTION OF THE DRAWINGS

FIGS. 11 and 12 illustrate how to mate an optical fiber connector with the optical fiber adapter of the present disclosure.

DETAILED DESCRIPTION OF THE PREFERRED EMBODIMENT

Figure 1:
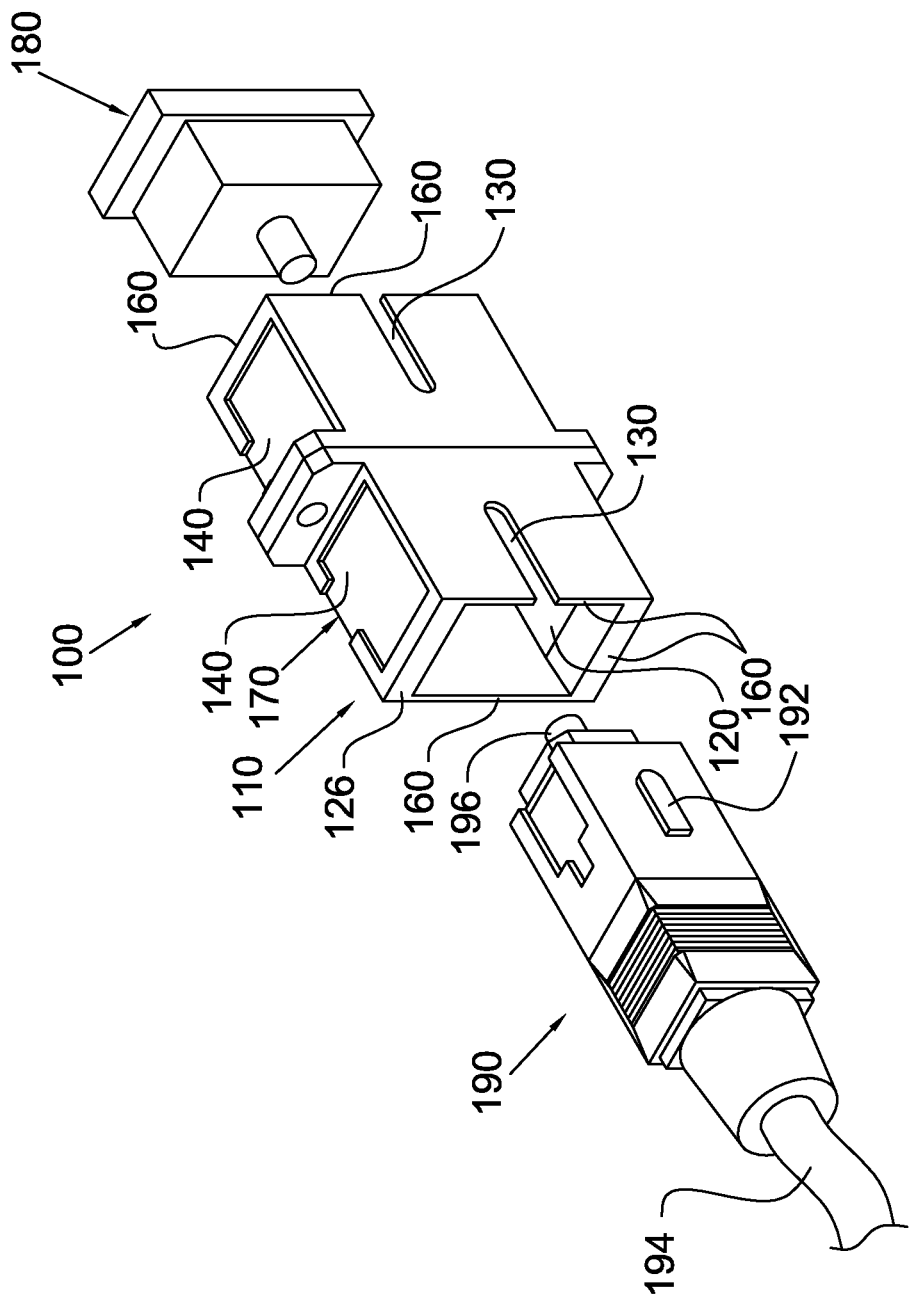
FIG. 1 is an elevated perspective view illustrating a conventional optical fiber adapter and a conventional optical fiber connector.
Figure 2:
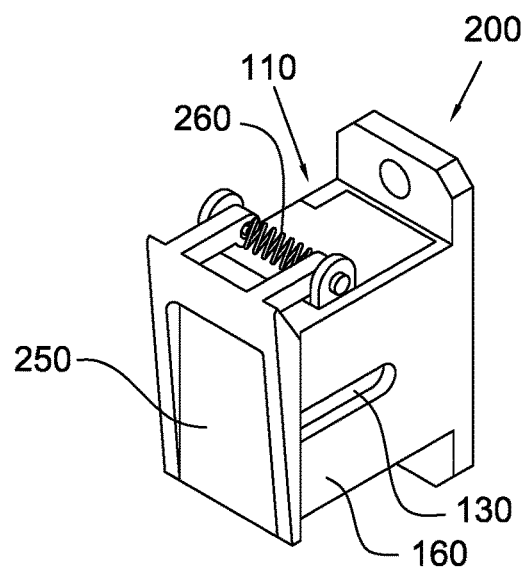
FIG. 2 is an elevated perspective view of a conventional optical fiber adapter with a cover for obstructing the light beams emitted from the receiving recess.
Figure 3:
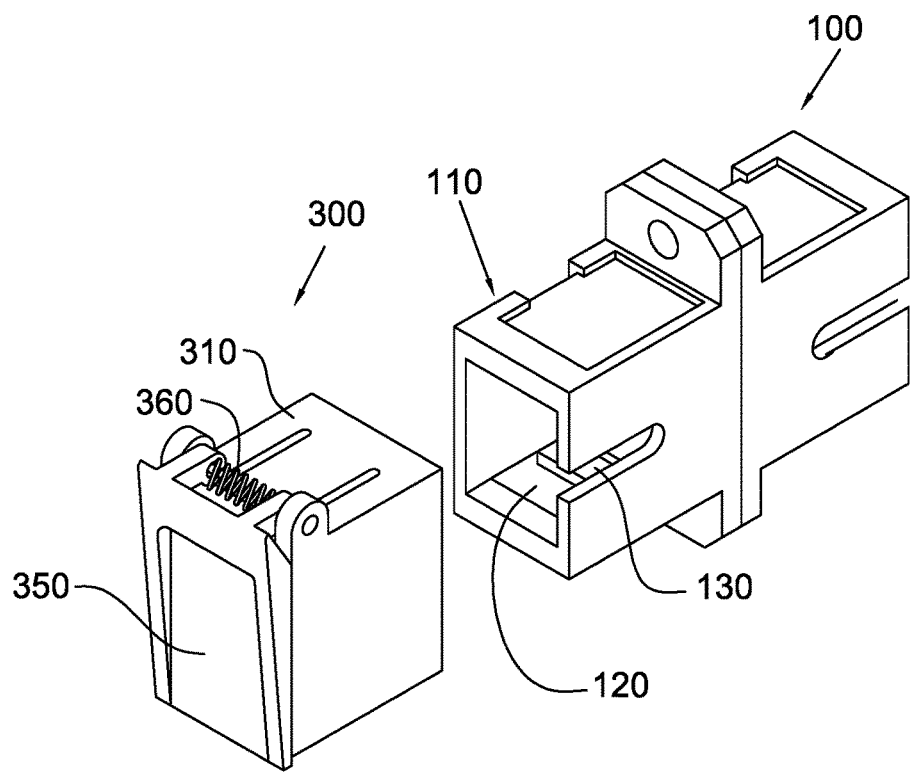
FIG. 3 is an elevated perspective view of a conventional protection cap for an optical fiber adapter.
Figure 4:
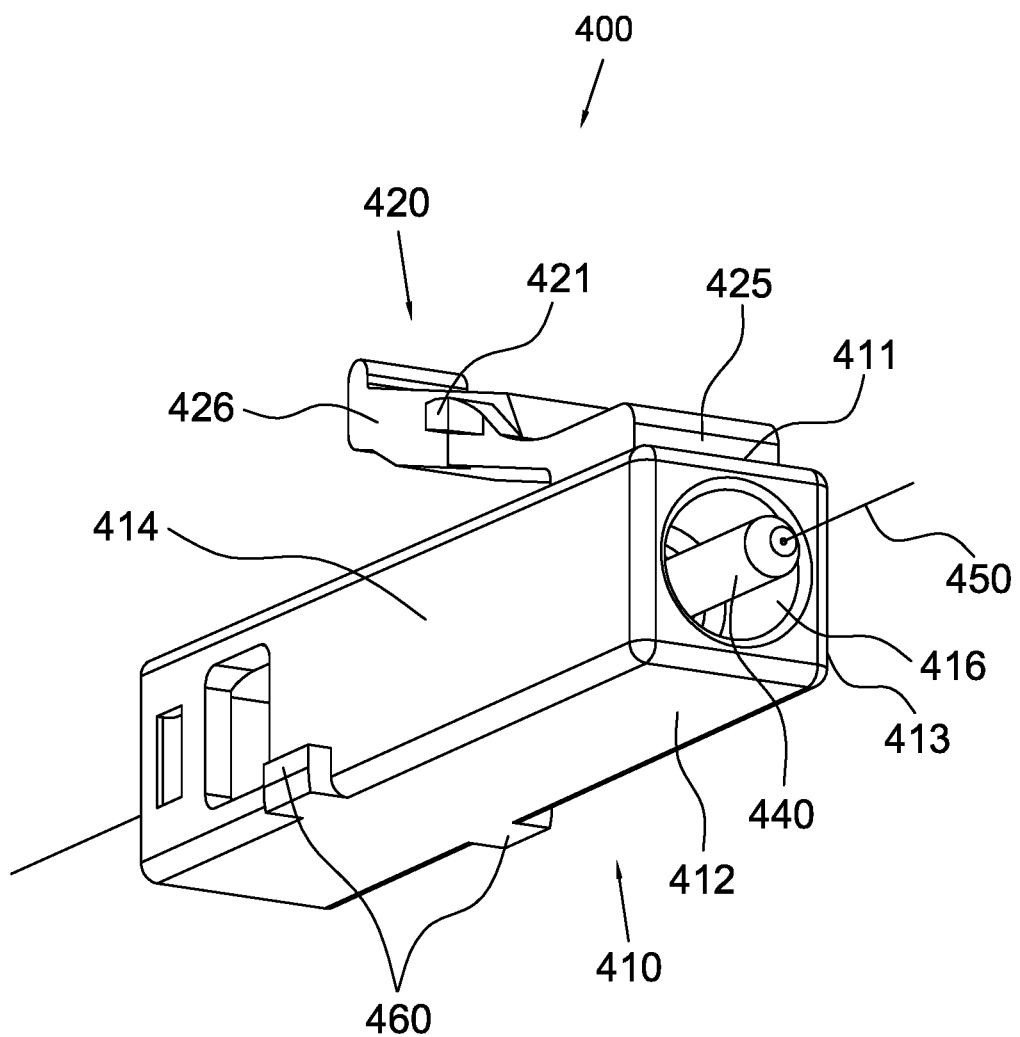
FIG. 4 is an elevated perspective view of a conventional LC type optical fiber connector.

Referring to FIG. 4, a conventional LC type optical fiber connector 400 has a generally rectangular shape with a square cross section. The connector 400 includes a rectangular hollow housing 410 comprised of a top side-wall 411, a bottom side-wall 412, a right side-wall 413 and a left side-wall 414, wherein the right side-wall 413 is opposite to the left side-wall 414 and connects with the bottom side-wall 412 and the top side-wall 411. A latch 420 is molded into the top side-wall 411 and includes a living hinge 425 which allows the tab 426 to be moved up and down in a direction perpendicular to the central axis 450-450 of the connector 400. The latch 420 also includes a pair of protrusions 421 that are positioned on opposing sides of the tab 426. In addition, a ferrule 440 protrudes from a circular opening 416 on the front end of the housing 410. A spring is located inside the housing 410 to allow the ferrule 440 to move back and forth through the opening 416 (not shown in the figure). A pair of protrusions 460 is positioned on the right side-wall 413 and left side-wall 414, respectively.

Figure 5:
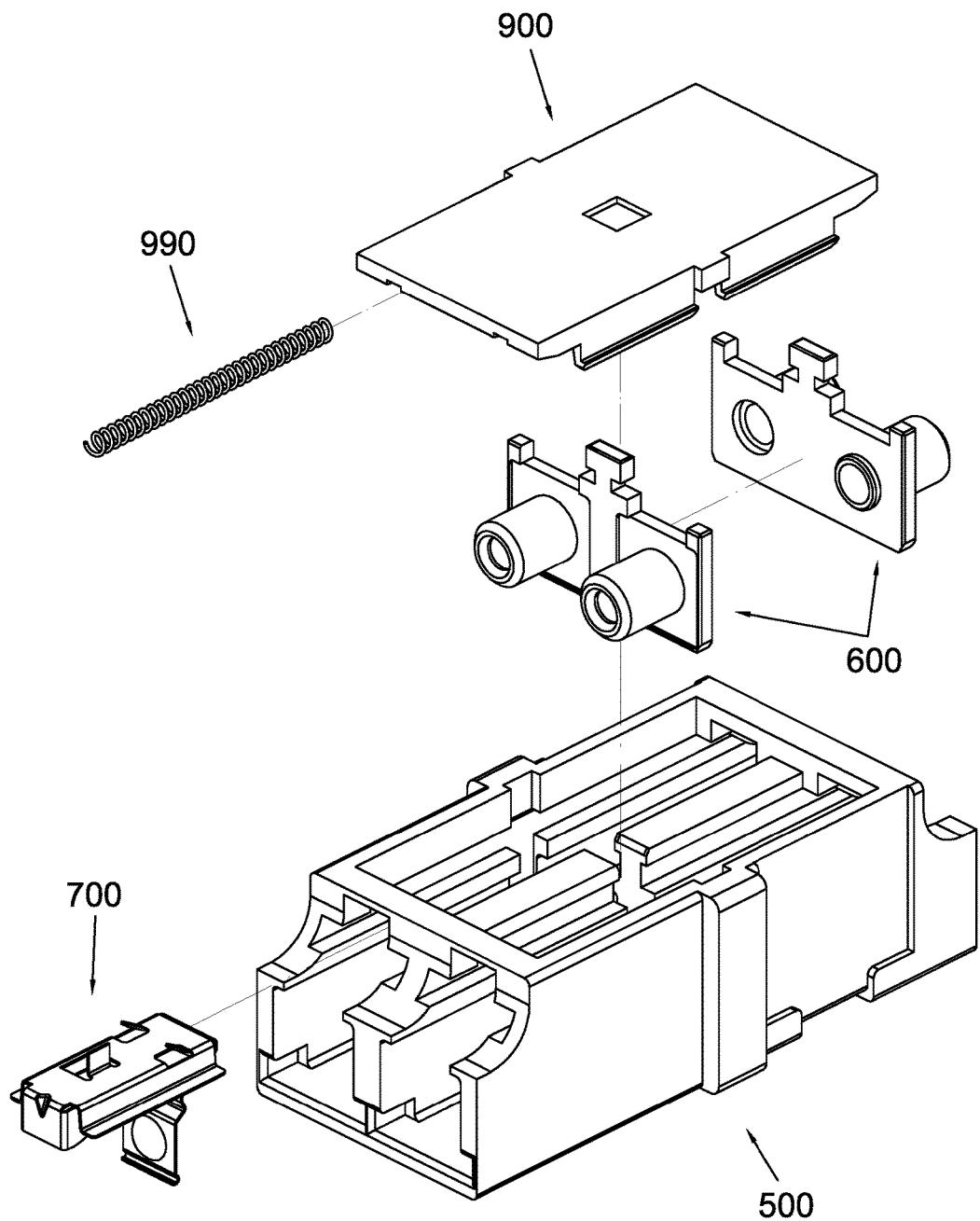
FIG. 5 is an exploded view of the optical fiber adapter of the present disclosure.
Figure 6:
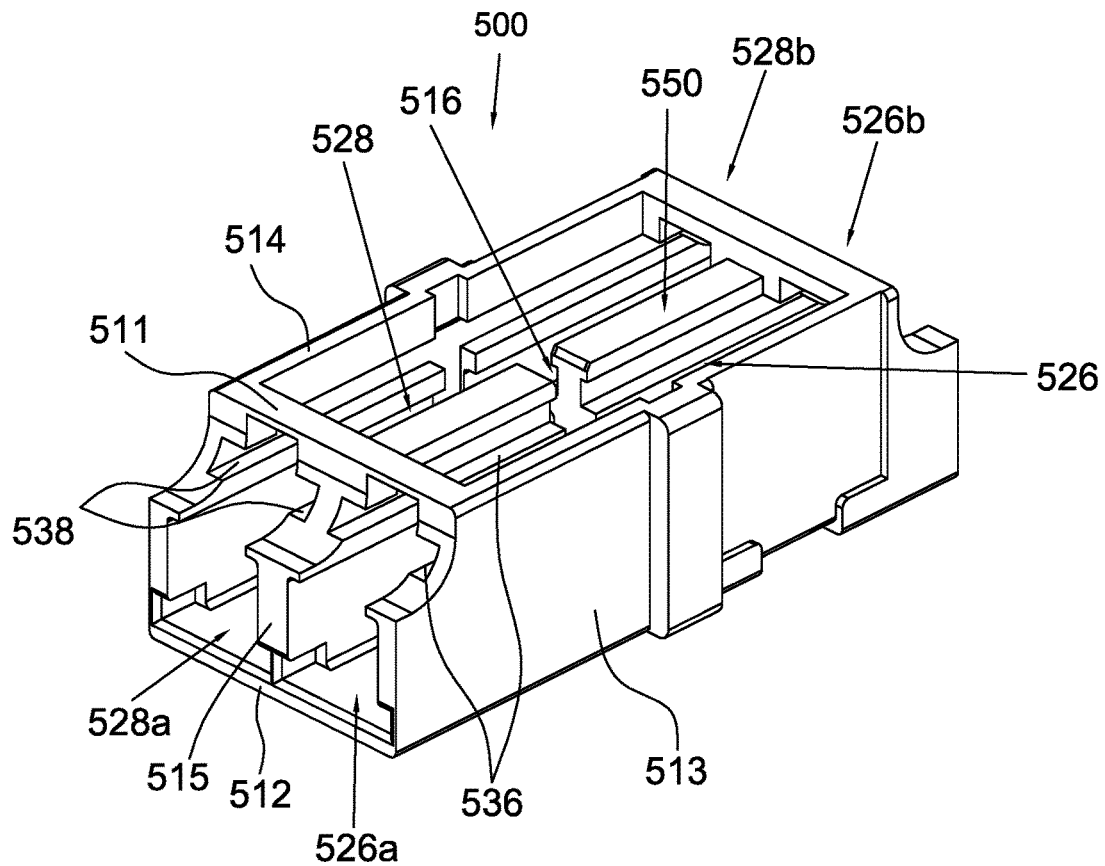
FIG. 6 is an elevated perspective view of the main body of the optical fiber adapter of the present disclosure.

Reference is now made to FIG. 5, the optical fiber adapter according to the present disclosure may be an LC duplex type optical fiber adapter and includes a unitary molded plastic main body 500, a pair of inner housings 600, an elastic shutter member 700, a cover plate 900 and a spring 990. Reference is made to FIG. 6, the main body 500 is substantially rectangular and has an accommodation room defined by a top wall 511, a bottom wall 512, a right wall 513 and a left wall 514, wherein the top wall 511 faces the bottom wall 512 and connects with the right wall 513 and left wall 514. The accommodation room is divided into two halves by a compartment wall 515 that is parallel to the right wall 513 and left wall 514 and connects with the top wall 511 and bottom wall 512. A break 516 is formed in the middle section of the compartment wall 515. The half of the accommodation room defined by the top wall 511, bottom wall 512, compartment wall 515 and right wall 513 is named as the right accommodation room 526 and the other half of the accommodation room defined by the top wall 511, bottom wall 512, compartment wall 515 and left wall 514 is named as the left accommodation room 528. The right accommodation room 526 has opposing first right opening 526a and second right opening 526b in an axial direction. Similarly, the left accommodation room 528 has opposing first left opening 528a and second left opening 528b in the axial direction. An access opening 550 is formed within the top wall 511 to allow the inner housings 600 to place within the accommodation room of the main body 500. A guiding groove 536 is formed within each of the right and compartment walls 513, 515 in the right accommodation room 526. The two guiding grooves 536 extend from the first right opening 526a toward the second right opening 526b in the axial direction and arrive at the break 516. A guiding groove 538 is formed within each of the left and compartment walls 514, 515 in the left accommodation room 528. The two guiding grooves 538 extend from the first left opening 528a toward the second left opening 528b in the axial direction and arrive at the break 516.

Figure 7:
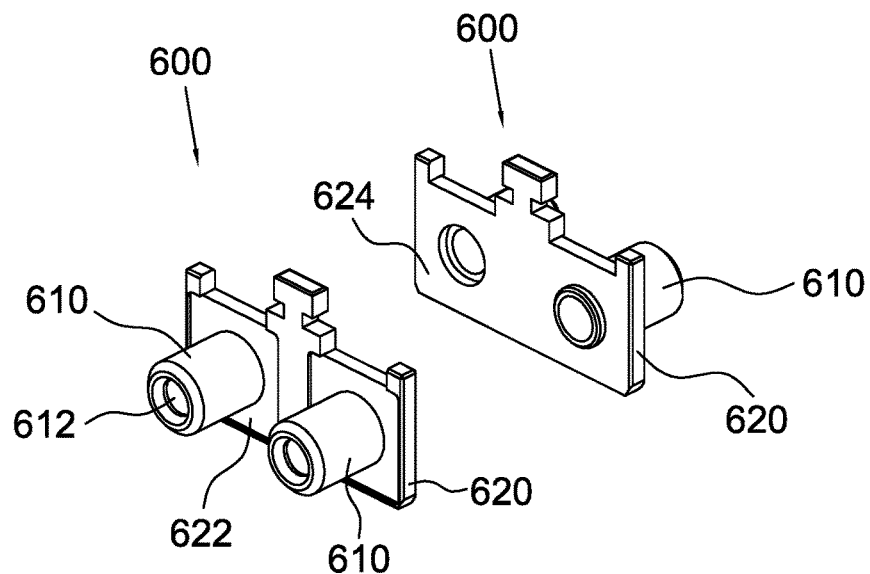
FIG. 7 is an elevated perspective view of the inner housings of the optical fiber adapter of the present disclosure.
Figure 8A:
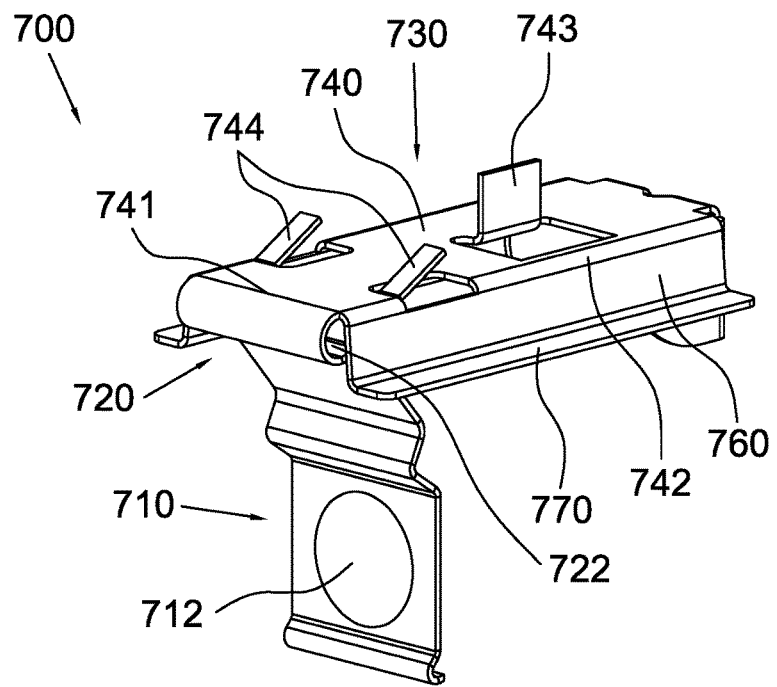
FIGS. 8a to 8d are different elevated perspective views of the shutter member of the optical fiber adapter of the present disclosure.
Figure 8B:
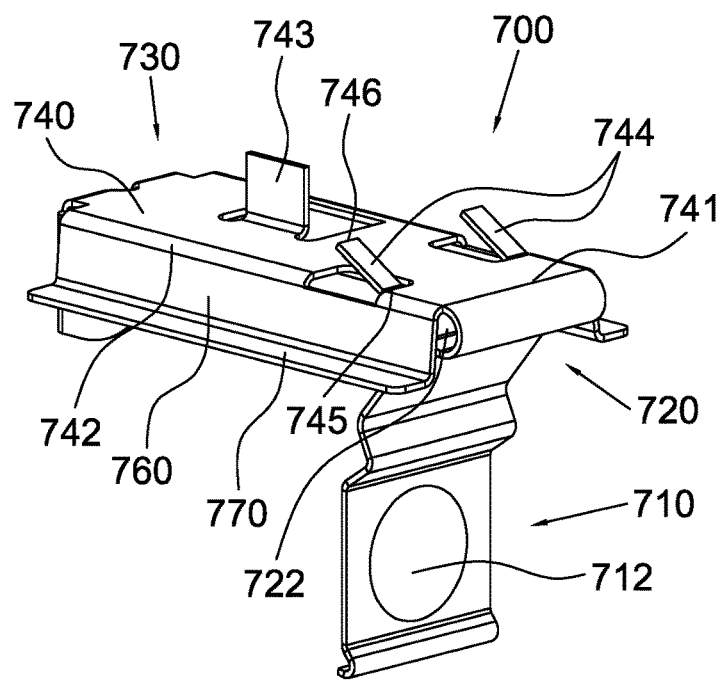
Figure 8C:
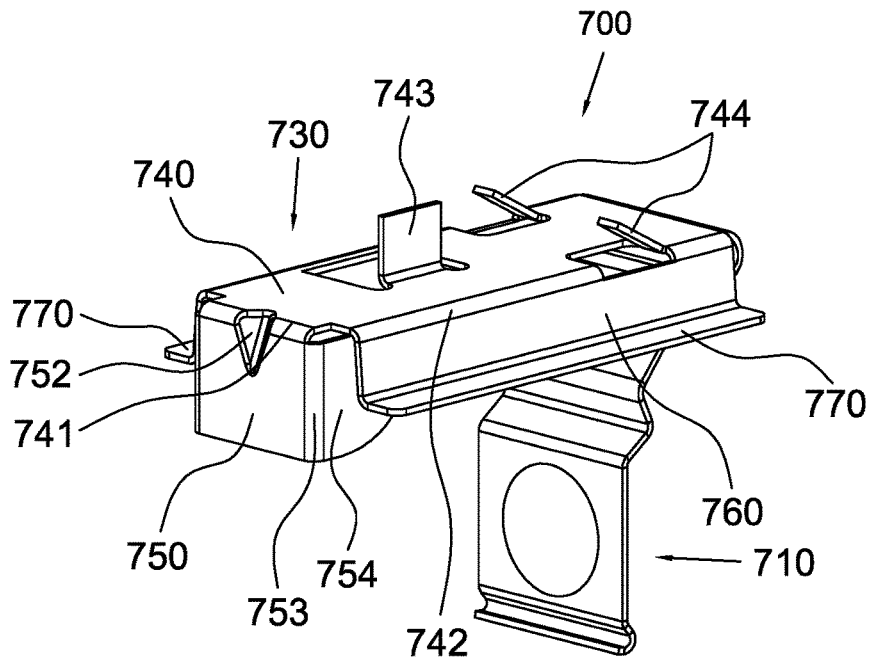
Figure 8D:
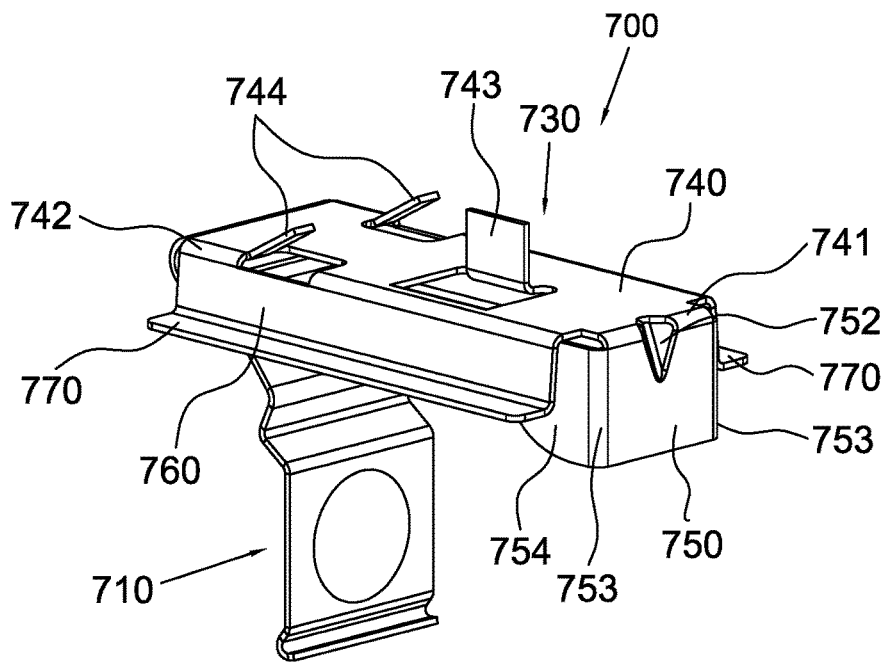

Reference is now made to FIG. 7, which illustrates the inner housings 600 of the present disclosure. The two inner housings 600 have the same shape and are constructed of plastics by an injection molding process. Each of the inner housings 600 includes two parallel hollow cylinders 610 extending in the axial direction from the front surface 622 of a generally rectangular flange 620. The hollow cylinder 610 has a front opening 612 opposite to a rear opening located at the flange 620. The two inner housings 600 may be connected together at their respective flanges 620 so as to connect the two cylinders 610 with the other two cylinders 610 to define two common cylinders. The two flanges 620 together define a thickness that is equal to the width of the break 516. When the two inner housings 600 are placed within the main body 500, the two cylinders 610 of one inner housing 600 are respectively aligned with the two cylinders 610 of the other inner housing 600 to define the two common cylinders.

Reference is made to FIGS. 8a to 8d, which illustrate the elastic shutter member 700 of the present disclosure. The shutter member 700 is integrally formed with metal and includes a shutter plate 710, a connecting portion 720 and a base portion 730. The connecting portion 720 connects the shutter plate 710 with the base portion 730 and is generally U-shaped. That is, the connecting portion 720 is curved and has a notch 722. The shutter plate 710 may contain a single plate or several plates. The shutter plate 710 extends downward from one of sides of the connecting portion 720. The shutter plate 710 may be pivotally moved relative to the base portion 730 about the connecting portion 720. The shutter plate 710 is bent close to the base portion 730 with a push force and quickly moves back when the push is withdrawn. The connecting portion 720 will deform when the shutter plate 710 is moved close to the base portion 730. The shutter plate 710 is formed with a circular bump 712, which is configured to face and is sized to cover the front opening 612 of one of the cylinders 610 of the inner housing 600. The base portion 730 includes a base plate 740. The base plate 740 is generally of rectangular shape and has a pair of longitudinal sides 742 connecting with a pair of transverse sides 741, wherein the longitudinal sides 742 may extend in the axial direction. One of the transverse sides 741 is connected to the connecting portion 720 and the other transverse side 741 is connected to a push plate 750. The push plate 750 has a rectangular shape and extends downward from and perpendicular to the base plate 740. An indentation 752 is formed at the intersection of the push plate 750 and base plate 740 by pressing. The indentation 752 may reinforce the mechanical strength of the push plate 750 so that the push plate 750 is not apt to be bent. In addition, two reinforcing sheets 754 respectively extend vertically from two opposing sides of the push plate 750. The reinforcing sheets 754 extend toward and substantially perpendicular to the base plate 740. The reinforcing sheets 754 may also reinforce the mechanical strength of the push plate 750. A protrusion sheet 743 protrudes upward from the base plate 740. Two hooks 744 are coupled to the base plate 740. The two hooks 744 may be two elastic sheets. The elastic sheets 744 are elongated and protrude upward at an angle inclined to the base plate 740. The hook 744 has a fixed end 745 and a free end 746 opposite to the fixed end 745. The fixed end 745 is closer to the connecting portion 720 than the free end 746 is. The fixed end 745 is coupled to the base plate 740 and functions as a pivot such that the hook 744 may be pivotally moved relative to the base plate 740. Two guiding sheets 770 are respectively coupled to the longitudinal sides 742 of the base plate 740. The guiding sheets 770 are elongated and substantially parallel to the base plate 740. The guiding sheets 770 may be respectively coupled to the base plate 740 through two connecting sheets 760. The connecting sheets 760 are vertically connected to the base plate 740 and the guiding sheets 770, respectively.

Figure 9:
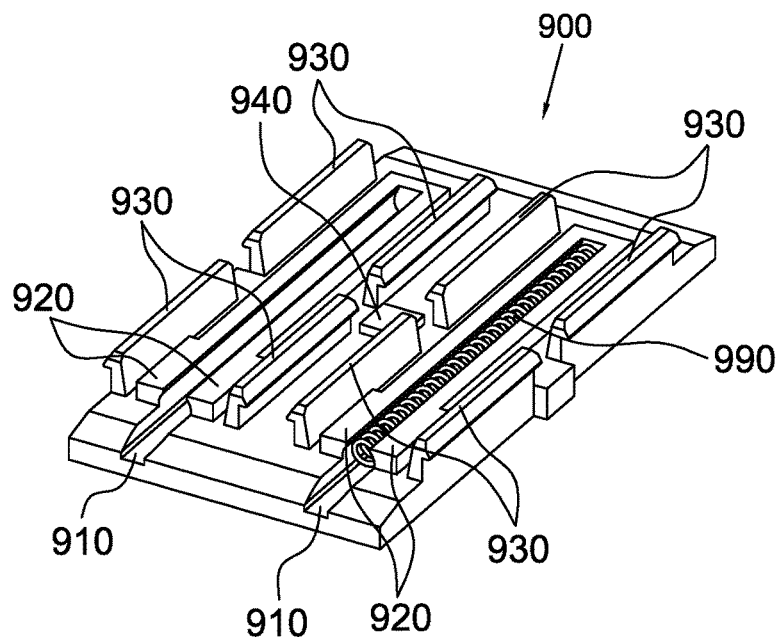
FIG. 9 is an elevated perspective view of the cover plate and spring of the optical fiber adapter of the present disclosure, wherein the spring is attached to the cover plate.

Reference is made to FIG. 9, which illustrates the cover plate 900 and spring 990 of the present disclosure. The cover plate 900 has a rectangular shape and is constructed of plastics by an injection molding process. The cover plate 900 is formed with two accommodation grooves 910 extending in the axial direction to receive the spring 990. In FIG. 9, the spring 990 is placed within one of the two accommodation grooves 910. The protrusion sheet 743 of the shutter member 700 may move to push against the spring 990. Two stop blocks 920 are located on two opposite sides of each of the accommodation grooves 910. The cover plate 900 is provided with a plurality of engagement portions 930, such as hooks extending in the axial direction to respectively engage with the right, left and compartment walls 513, 514, 515. In addition, a rectangular protrusion 940 is formed on the center of the cover plate 900 to be positioned corresponding to the break 516 in the compartment wall 515.

Figure 10:
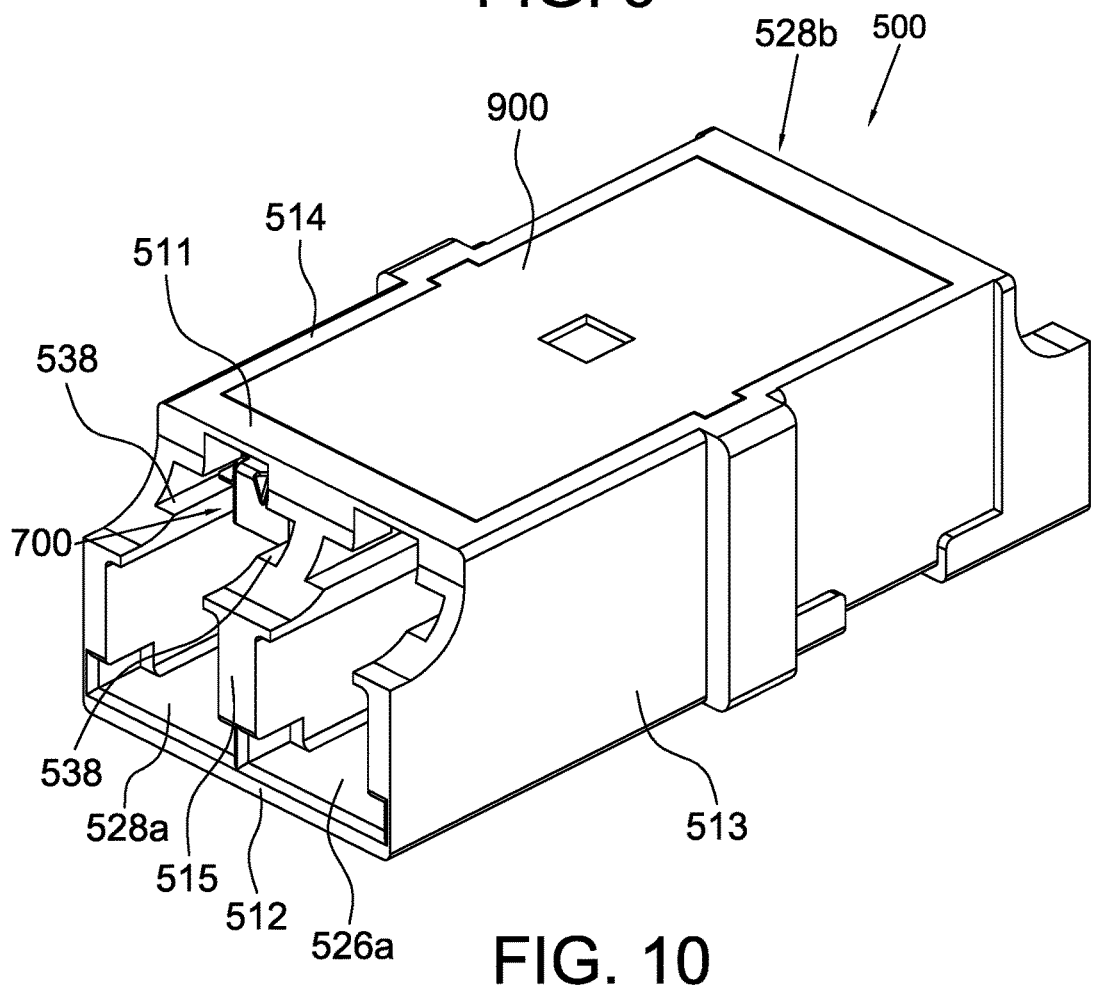
FIG. 10 is an elevated perspective view of the optical fiber adapter of the present disclosure.

When desiring to assemble the optical fiber adapter of the present disclosure, the two inner housings 600 are first connected together at their respective flanges 620. Afterward, the inner housings 600 are inserted into the main body 500 through the access opening 550 in such a manner that the two flanges 620 are inserted into the break 516 in the compartment wall 515. The cover plate 900 provided with the spring 990 is pushed down to cover the access opening 550 such that the engagement portions 930 respectively engage with the right, left and compartment walls 513, 514, 515 of the main body 500. Also, the protrusion 940 of the cover plate 900 is located in the break 516 to press on the flanges 620 of the two inner housings 600. Subsequently, the shutter member 700 is inserted into the left accommodation room 528 through the first left opening 528*a* in such a manner that the connecting portion 720 is leading and the two guiding sheets 770 are respectively inserted into the two guiding grooves 538. The shutter member 700 continues to be pushed toward the second left opening 528*b*. Meanwhile the guiding sheets 770 respectively slide in the guiding grooves 538 and the two hooks 744 are respectively pressed to deform by the two stop blocks 920 on the cover plate 900. After the hooks 744 pass the stop blocks 920, the hooks 744 will spring up to their original positions and the protrusion sheet 743 will push against one end of the spring 990. FIG. 10 illustrates the optical fiber adapter of the present disclosure.

Reference is made to FIG. 11, when an optical fiber connector 400 of FIG. 4 is not inserted into the main body 500 from the first left opening 528*a*, the spring 990 will push against the protrusion sheet 743 to move the shutter member 700 toward the first left opening 528*a*. Meanwhile, the circular bump 712 on the shutter plate 710 will be located in front of and come in contact with the front opening 612 of the cylinder 610 facing the first left opening 528*a* in the left accommodation room 528. When an optical fiber connector 400 of FIG. 4 is inserted into the main body 500 from the second left opening 528*b* (not shown in the figure), the light beams that emit from the optical fiber connector 400 and then propagate out from the front opening 612 of the cylinder 610 will be obstructed by the shutter plate 710. As a result, the occurrence of exposure to the harmful light beams may be avoided. In addition, the shutter plate 710 covers the front opening 612 of the cylinder 610 and therefore may prevent the interior of the cylinder 610 from dust.

Reference is made to FIGS. 11 and 12, there is no need to detach the shutter member 700 from the main body 500 prior to inserting an optical fiber connector 400 into the left accommodation room 528 from the first left opening 528*a*. When the optical fiber connector 400 of FIG. 4 is inserted into the main body 500 from the first left opening 528*a*, the living hinge 425 of the latch 420 at the optical fiber connector 400 will confront the push plate 750 of the shutter member 700. Meanwhile, the guiding sheets 770 of the shutter member 700 will respectively slide in the two guiding grooves 538 so that the shutter member 700 may be moved toward the second left opening 528*b* smoothly. The protrusion sheet 743 will slide in the accommodation groove 910 and press against the spring 990. The shutter plate 710 will be bent by the cylinder 610 and slide on a lateral surface of the cylinder 610 facing the first left opening 528*a* in the left accommodation room 528. When the optical fiber connector 400 is moved to being in place, the shutter plate 710 is pushed past the flange 620 facing the first left opening 528*a* and arrives at a position between the cover plate 900 and the cylinder 610 facing the second left opening 528*b* in the left accommodation room 528. Upon pulling out the optical fiber connector 400 from the main body 500, the pressed spring 990 will spring up to push the shutter member 700 toward the first left opening 528*a* to its original position and the elastic shutter plate 710 will quickly spring up to an original position to cover the front opening 612 of the cylinder 610 and therefore obstruct the light beams emitted therefrom as a result of elasticity. As a result, the occurrence of exposure to the harmful light beams may be avoided.

Figure 13:
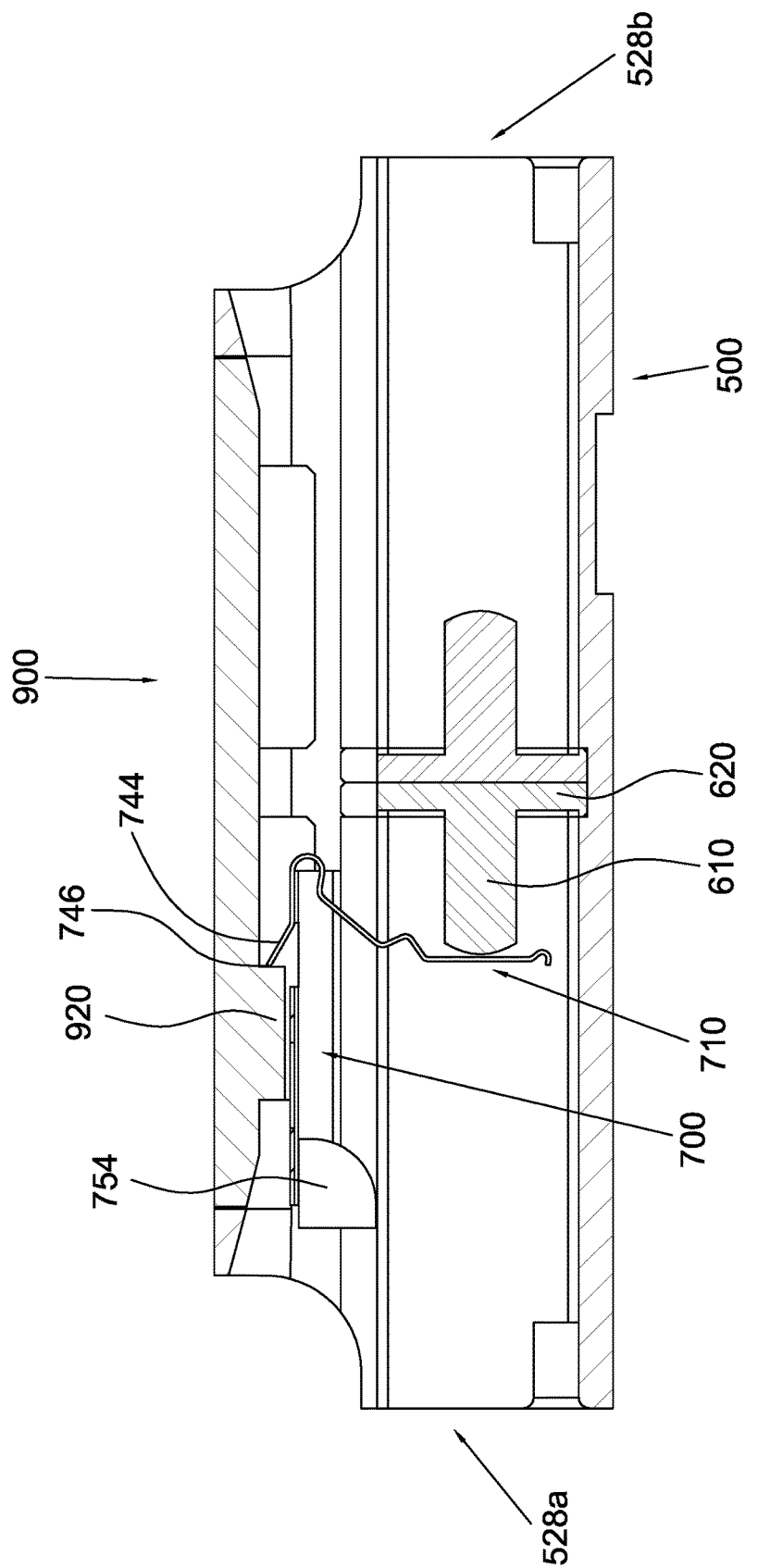
FIG. 13 illustrates that the hook at the shutter member of the optical fiber adapter hooks on to the block at the cover plate according to the present disclosure.

Reference is made to FIG. 13, after the hooks 744 have passed the stop blocks 920, the hooks 744 will respectively hook on to the stop blocks 920 in such a manner that the free ends 746 of the hooks 744 respectively come in contact with the lateral surfaces of the stop blocks 920 when a pull force is exerted on the shutter member 700. Therefore, this arrangement may prevent the shutter member 700 from being pulled out of the main body 500 from the first left opening 528a.

Figure 14:
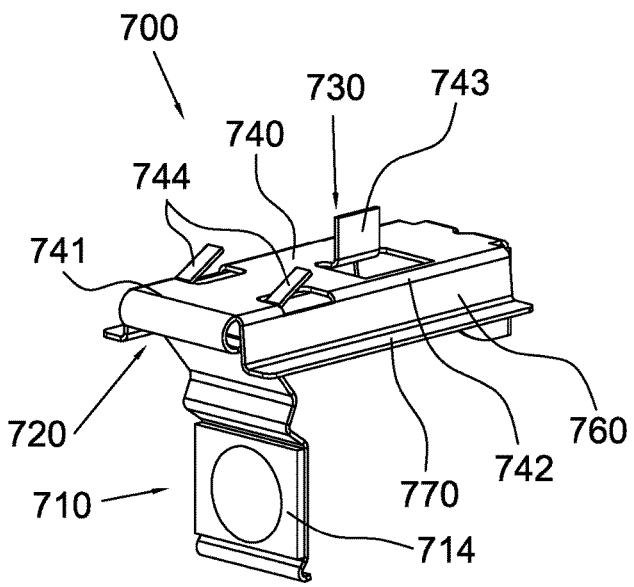
FIG. 14 illustrates that a transparent sheet is coupled to the shutter member of the optical fiber adapter of the present disclosure.
Figure 15:
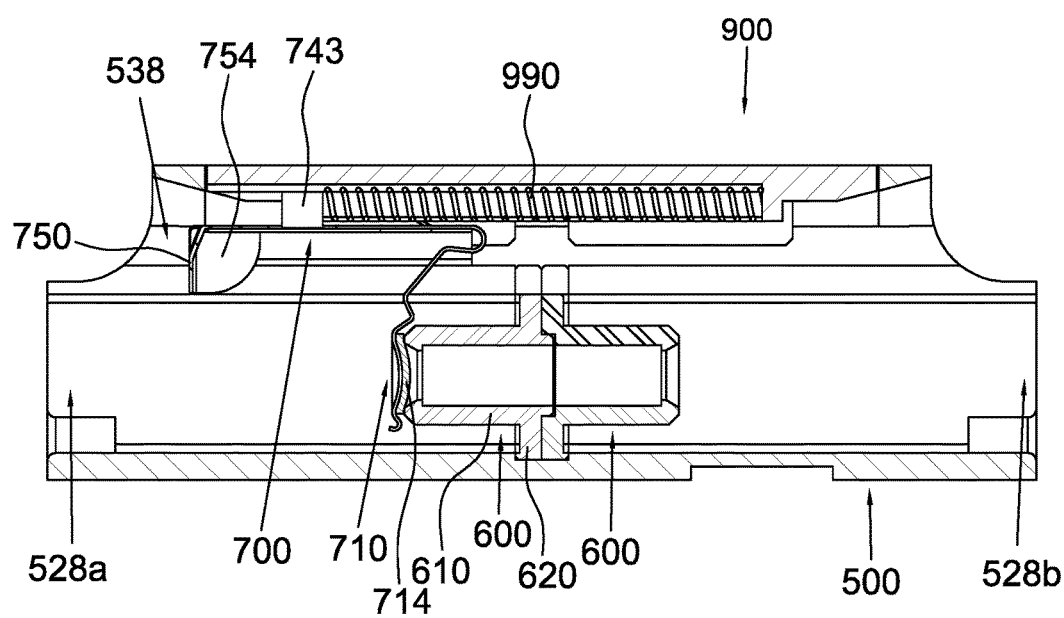
FIG. 15 is a cross-sectional view of the optical fiber adapter of the present disclosure, wherein the transparent sheet is coupled to the shutter member.

Reference is now made to FIGS. 14 and 15, a transparent sheet 714 such as a plastic sheet may be attached to the shutter plate 710. The transparent sheet 714 is provided to come in contact with and cover the front opening 612 of the cylinder 610 when no one optical fiber connector is inserted from the first left opening 528a into the main body 500. This arrangement may help verify whether the optical path is unobstructed. More specifically, when an optical fiber connector has been inserted from the second left opening 528b into the main body 500 to mate with the optical fiber adapter of the present disclosure (not shown in the figure), a visible light beam may be coupled to the optical fiber connector. If the optical path is unobstructed, the visible light beam will emit from the front opening 612 of the cylinder 610 and be then incident on the shutter plate 710. The shutter plate 710 may scatter the visible light beam and a part of the scattered visible light beam will emit from the edges of the transparent sheet 714 so that an operator may see the scattered visible light beam through the first left opening 528a. Accordingly, it is verified that the optical path is unobstructed.

According to the optical fiber adapter of the present disclosure, the shutter plate 710 provided with the transparent sheet 714 may obstruct the propagation of the high-power light beams emitted from the cylinder 610 to prevent the eyes from direct exposure to the high-power light beams. In addition, the shutter plate 710 provided with the transparent sheet 714 covers the front opening 612 of the cylinder 610 and therefore may prevent the interior of the cylinder 610 from dust.

Although the shutter member 700 is installed in the left accommodation room 528 of the main body 500 as described in the present disclose, it will be appreciated that the shutter member 700 may be arranged in either or both of right and left accommodation rooms 526, 528. In addition, it will also be appreciated that although the disclosure has been explained with the LC duplex adapter, the shutter member 700 of the present disclosure may be used in LC simplex adapter, SC duplex adapter, SC simplex adapter, or other types of adapters.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter for optically coupling two optical fiber connectors with each other, the optical fiber adapter comprising:
    a main body having an accommodation room defined by a first wall, a second wall, a third wall and a fourth wall, the first wall facing the third wall and connecting with the second and fourth walls, wherein the accommodation room has opposing first and second openings in an axial direction to respectively allow the two optical fiber connectors to insert into the accommodation room to mate with each other;
    an inner housing positioned within the accommodation room, the inner housing comprising:
        a flange having a front surface; and
        a hollow cylinder extending from the front surface of the flange toward the first opening of the accommodation room, the hollow cylinder having an opening facing the first opening of the accommodation room;
    an elastic shutter member positioned within the accommodation room, the shutter member comprising:
        a base portion, wherein the base portion is moved toward the second opening with the insertion of the optical fiber connector into the accommodation room from the first opening;
        a shutter plate; and
        a connecting portion connecting the base portion with the shutter plate; and
        wherein the shutter plate is pivotally movable about the connecting portion, the base portion is configured to pull the shutter plate to slide on an lateral surface of the hollow cylinder, and the shutter plate is further configured to extend from the connecting portion to a position in front of the opening of the hollow cylinder when no one optical fiber connector is inserted into the accommodation room from the first opening;
    a spring positioned within the accommodation room to push the base portion toward the first opening of the accommodation room.

2. The optical fiber adapter as claimed in claim 1, wherein a guiding groove is formed on each of the second and fourth walls for the base portion to slide therein.

3. The optical fiber adapter as claimed in claim 1, wherein an access opening is formed on the first wall to allow the inner housing to place within the accommodation room of the main body, the optical fiber adapter further comprising:
    a cover plate positioned to cover the access opening on the first wall.

4. The optical fiber adapter as claimed in claim 3, wherein an accommodation groove is formed on the cover plate to receive the spring.

5. The optical fiber adapter as claimed in claim 1, wherein the base portion comprises:
    a base plate; and
    a protrusion sheet coupled to the base plate to push against the spring.

6. The optical fiber adapter as claimed in claim 2, wherein the base portion comprises:
    a base plate;
    two connecting sheets vertically coupled to two opposing sides of the base plate, respectively; and
    two guiding sheets vertically coupled to the two connecting sheets, respectively, wherein the guiding sheets are configured to respectively slide in the guiding grooves.

7. The optical fiber adapter as claimed in claim 3, wherein the base portion comprises:
    a base plate; and
    two hooks coupled to the base plate, wherein the hooks are configured to hook on to the cover plate to prevent the shutter member from being pulled out of the accommodation room from the first opening.

8. The optical fiber adapter as claimed in claim 1, wherein the base portion is further configured to pull the shutter plate to move past the flange of the hollow cylinder.

9. The optical fiber adapter as claimed in claim 1, wherein the base portion comprises:
   a base plate; and
   a push plate vertically coupled to the base plate, wherein the push plate is configured to be in contact with the optical fiber connector inserted into the accommodation room from the first opening to push the base plate toward the second opening.

10. The optical fiber adapter as claimed in claim 1, further comprising:
   a transparent sheet coupled to the shutter plate to cover the opening of the hollow cylinder.

11. The optical fiber adapter as claimed in claim 1, further comprising:
   a bump formed on the shutter plate to cover the opening of the hollow cylinder.

\* \* \* \* \*